(12) United States Patent
Park et al.

(10) Patent No.: US 7,231,149 B2
(45) Date of Patent: Jun. 12, 2007

(54) BIDIRECTIONAL OPTICAL ADD-DROP MULTIPLEXER

(75) Inventors: Sung-Bum Park, Suwon-si (KR);
Yun-Je Oh, Yongin-si (KR);
Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 644 days.

(21) Appl. No.: 10/785,217

(22) Filed: Feb. 24, 2004

(65) Prior Publication Data

US 2005/0031349 A1 Feb. 10, 2005

(30) Foreign Application Priority Data

Aug. 9, 2003 (KR) .................. 10-2003-0055200

(51) Int. Cl.
*G02B 6/28* (2006.01)
*G02B 6/34* (2006.01)
*G02B 6/293* (2006.01)
*G02B 6/26* (2006.01)
*H04J 14/02* (2006.01)

(52) U.S. Cl. .................. 398/83; 398/84; 398/85; 385/24; 385/37

(58) Field of Classification Search ........... 398/83–85; 385/24, 37
See application file for complete search history.

(56) References Cited

U.S. PATENT DOCUMENTS

| 5,812,306 | A | * | 9/1998 | Mizrahi ................ 359/341.2 |
| 5,825,520 | A | * | 10/1998 | Huber .................... 398/87 |
| 7,092,634 | B2 | * | 8/2006 | Lee et al. ................ 398/59 |
| 2002/0196495 | A1 | * | 12/2002 | Grasso et al. ............ 359/127 |
| 2002/0197012 | A1 | * | 12/2002 | Liu et al. ................ 385/37 |
| 2004/0151493 | A1 | * | 8/2004 | Kim et al. ............... 398/3 |

* cited by examiner

*Primary Examiner*—Jason Chan
*Assistant Examiner*—Danny Wai Lun Leung
(74) *Attorney, Agent, or Firm*—Cha & Reiter, L.L.C.

(57) ABSTRACT

A bidirectional optical add-drop multiplexer adds and drops optical signals having specific wavelengths among the WDM optical signals transmitted bidirectionally through one of the optical transmission lines connected between neighbor nodes in a bidirectional WDM ring network.

26 Claims, 4 Drawing Sheets

_US 7,231,149 B2_

BIDIRECTIONAL OPTICAL ADD-DROP MULTIPLEXER

CLAIM OF PRIORITY

This application claims priority to an application entitled "Bidirectional optical add-drop multiplexer," filed in the Korean Intellectual Property Office on Aug. 9, 2003 and assigned Ser. No. 2003-55200, the contents of which are hereby incorporated by reference.

BACKGROUND OF THE INVENTION

1. Field of the Invention

The present invention relates to a Wavelength Division Multiplexing (WDM: Wavelength Division Multiplexing) optical communication network, and more particularly to an optical add-drop multiplexer which adds and drops optical signals having specific wavelengths of WDM optical signals bi-directionally transmitted through a single transmission line at each remote node in a WDM ring network.

2. Description of the Related Art

As of late, metro/access networks for connecting central office nodes and subscribers are attracting more attention as home communication traffic increases due to spread of the Internet. Methodology must be available for easily increasing the capacity of the networks to match the increase in demand for ultra high speed services, and the methodology must be economical in order to accept the many new subscribers. The metro/access networks, if implemented to operate in a WDM system, can transfer WDM optical signals by a plurality of wavelengths regardless of transmission methods or speed. Thus the networks can efficiently transfer the traffic at a high speed and on wide bandwidths.

Optical WDM bidirectional hubbed ring networks can be employed as metro/access networks useful in this regard. An optical WDM bidirectional hubbed ring network has the shape of a ring, and is formed by a single line which connects the central office and a plurality of remote nodes with each other. WDM optical signals having two WDM channels are transmitted through the single line in directions opposite to each other. For instance, WDM optical signals having odd wavelengths and even channels are transmitted in one direction and in the reverse direction, respectively. The central node is connected not only to the remote nodes but also to other networks. The remote nodes are established nearby areas of high subscribers concentration, and serve to connect the central office to subscribers. Therefore, each remote node must be able to drop, for its own use, specific signals transmitted from the central office and add specific signals to the optical transmission line for conveyance to the networks. Accordingly, each remote node comprises optical add-drop multiplexers which add or drop optical signals having specific wavelength among the bidirectional WDM optical signals in the optical WDM bidirectional hubbed ring networks.

As shown in FIG. 1, the bidirectional optical add-drop multiplexer constituting a remote node in an optical WDM bidirectional hubbed ring network separates two WDM optical signals by using optical circulators 104, 118 each having three ports. Two WDM optical signals are respectively inputted through optical transmission lines 100, 102 connecting both sides of the remote note to two neighbor nodes (not depicted), in the shape of a ring network. That is, the lines 100, 102 are each portions of the same single transmission line connecting the nodes of the ring network.

The bidirectional optical add-drop multiplexer adds and drops optical signals having specific wavelengths by means of optical circulators 106, 114 and an optical channel selector 110 located in a first side and optical circulators 108, 116 and an optical channel selector 112 located in a second side. Here, the optical signals added or dropped in the same direction of the multiplexer have the same wavelength. Namely, if optical signals inputted in the first direction of the multiplexer are dropped, optical signals having the same wavelength are added and transmitted in the same direction.

When the bidirectional optical add-drop multiplexer shown in FIG. 1 receives optical signals having wavelengths $\lambda 2$, $\lambda 4$, $\lambda 6$ corresponding to three channels 2, 4, 6 from the optical transmission line 100 connected with a first of two neighbor nodes, an optical signal of wavelength $\lambda 2$ is dropped and a signal of the same wavelength may be added. Likewise, when optical signals having wavelengths $\lambda 1$, $\lambda 3$, $\lambda 5$ corresponding to three channels 1, 3, 5 are received from the optical transmission line 102 connected with the second neighbor node, an optical signal of wavelength $\lambda 1$ is dropped and a signal of the same wavelength may be added.

In particular, the optical signals having wavelengths $\lambda 2$, $\lambda 4$, $\lambda 6$ are inputted to a port 104a of the optical circulator 104 through the optical line 100 and those having wavelengths $\lambda 1$, $\lambda 3$ and $\lambda 5$ are inputted to a port 118a of the optical circulator 118 through the optical line 102. The optical circulators 104 to 108 and 114 to 118 are 3-port optical circulators having three ports circularly arrayed. As already known in the art, each port of the optical circulators 104 to 108 and 114 to 118 outputs the optical signals to the next port according to the sequence arrayed in clockwise or counterclockwise direction in FIG. 1.

The optical signals having wavelengths $\lambda 2$, $\lambda 4$, $\lambda 6$ inputted the port 104a of the circulator 104 are outputted to a port 104b and progress along an upper route shown in FIG. 1, which extends from an optical circulator 106 through an optical wavelength selector 110 to an optical circulator 114. In the same manner, the optical signals having wavelengths $\lambda 1$, $\lambda 3$, $\lambda 5$ inputted the port 118a of the circulator 118 are outputted a next port 118b and progress along a lower route shown in FIG. 1, which extends from an optical circulator 116 through an optical wavelength selector 112 to an optical circulator 108. The optical wavelength selectors 110, 112 select the wavelengths $\lambda 2$, $\lambda 1$ as reflection wavelengths, respectively. Thus, the optical signals having the wavelengths $\lambda 2$, $\lambda 1$ are reflected by the optical wavelength selectors 110, 112, respectively and the other signals not being reflected pass through the optical wavelength selectors 110, 112

As described above, the optical signals having the wavelengths $\lambda 2$, $\lambda 4$, $\lambda 6$ inputted to a port 106a of the optical circulator 106 from the port 104b of the optical circulator 104 are outputted to a next port 106b and then inputted to the optical wavelength selector 110. The optical signal having the wavelength $\lambda 2$ is reflected by the optical wavelength selector 110, again inputted to the port 106b of the optical circulator 106 and dropped by outputting to a port 106c of the optical circulator 106. The other optical signals having the other wavelengths $\lambda 4$, $\lambda 6$ pass through the optical wavelength selector 110 and are inputted to a port 114b of the optical circulator 114. Concurrently, an optical signal having the wavelength $\lambda 2$ to be added is inputted to a port 114a of the optical circulator 114. Thus, the optical signal of wavelength $\lambda 2$ to be added is outputted to the port 114b of the optical circulator 114, reflected by the optical wavelength selector 110, and inputted to the port 114b of the optical circulator 114 with the optical signal of the wavelengths λ4, λ6. Accordingly, the optical signals of the wavelengths λ2, λ4, λ6 from the port 114c of the optical circulator 114 are inputted to a port 118c of the optical circulator 118 and transmitted through the optical line 102 by outputting to the port 118a of the optical circulator 118.

Analogously, the optical signals of the wavelengths λ1, λ3, λ5 inputted to a port 116a of the optical circulator 116 from a port 118b of the optical circulator 118 are outputted to a port 116b and inputted to the optical wavelength selector 112. The optical signal of the wavelength λ1 is reflected by the optical wavelength selector 112, inputted to the port 116b and dropped by outputting to a port 116c. The other optical signals of the other wavelengths λ3, λ5 pass through the optical wavelength selector 112 and are inputted to a port 108b of the optical circulator 108. An optical signal of the wavelength λ1 is added by means of port 108a. The optical signal of the wavelength λ1 to be added is outputted to the port 108b, after reflection by the optical wavelength selector 112, returns to the port 108b with the optical signals of the wavelengths λ3, λ5. Therefore, the optical signals of the wavelengths λ1, λ3, λ5 from the port 108c are transmitted through the optical line 100 by being outputted to the port 104a.

As described above, when the bidirectional optical add-drop multiplexer drops optical signals inputted in one direction, the bidirectional optical add-drop multiplexer adds an optical signal having the same wavelength as that of the dropped signals to the other optical signals and transmits them in the same direction.

Disadvantageously, since both added and dropped signals of the same wavelength are reflected by the same optical wavelength selector, the cross talk of the added optical signal degrades the quality of the dropped optical signal.

To prevent the above problems, the optical wavelength selectors must have an isolation of above 30 dB. However, the optical wavelength selectors having high isolation are very expensive, so that the cost of the multiplexer increases.

Another technique used to resolve the above problem is disclosed in U.S. Pat. No. 5,926,300, entitled "OPTICAL ADD-DROP MULTIPLEXER", filed on Jul. 20, 1999. This multiplexer not only uses respectively different optical wavelength selectors for the added optical signal and the dropped optical signal but also uses optical isolators between two optical wavelength selectors so that it can prevent the declination of the transmission characteristics resulting from leak components, which are not reflected but transmitted.

However, according to the U.S. Pat. No. 5,926,300, although the add-drop multiplexer can prevent the declination of the transmission characteristics resulting from such leak components, the number of the optical wavelength selectors increases and the optical isolators are supplemented. Accordingly, the structure of the multiplexer becomes complex and therefore the cost of the multiplexer also increases.

As described above, the typical bidirectional optical add-drop multiplexer has the same wavelengths for both the added and the dropped optical signal, and both the added and the dropped optical signal are reflected by the same optical wavelength selector. Thus, the resulting cross-talk between the optical signals added and dropped degrades optical signal quality characteristics. Accordingly, preventing the above problems requires a multiplexer having a complex structure and higher cost.

SUMMARY OF THE INVENTION

The present invention has been made to solve the above-mentioned problems occurring in the prior art, and an object of the present invention is to provide a bidirectional optical add-drop multiplexer of relatively simple structure and which avoids the declination of the optical signal quality resulting from cross-talk between the added and dropped optical signals.

It is second object of the present invention to provide a bidirectional optical add-drop multiplexer which can decrease the number of optical elements.

In order to accomplish these objects, there is provided a bidirectional optical add-drop multiplexer for WDM (wavelength division multiplexing) optical signals being transmitted in directions opposite to each other through different WDM channels of one optical transmission line in an optical WDM bidirectional ring network. The multiplexer includes first and second optical circulators each having four ports. An optical signal having a wavelength to be added is inputted to the first port of the circulator with four ports. The multiplexer further comprises a first WDD (wavelength division demultiplexer) which drops an optical signal having a specific wavelength by demultiplexing optical WDM signals transmitted through a first portion of the one optical transmission line. The WDD further outputs to a third port of the first optical circulator optical signals not being dropped, and transmits to the first portion optical signals of a second portion of the optical transmission line inputted from the third port of the first optical circulator. The multiplexer is further comprised of a first optical wavelength selector which is connected between a fourth port of the first optical circulator and a second port of the second optical circulator. The selector reflects an optical signal that is to be added among optical signals inputted from the third port of the first optical circulator, and passes optical signals not being added. The multiplexer also has a second WDD which drops an optical signal having a specific wavelength by demultiplexing optical WDM signals transmitted through the second portion, outputs to a third port of the second optical circulator optical signals not being dropped, and transmits to the second portion optical signals inputted from the third port of the second optical circulator. Included also in the multiplexer is a second optical wavelength selector which is connected between a second port of the first optical circulator and a fourth port of the second optical circulator, reflects an optical signal having a wavelength that is to be added among the optical signals inputted from the third port of the second optical circulator, and passes optical signals not being added.

BRIEF DESCRIPTION OF THE DRAWINGS

The above and other objects, features and advantages of the present invention will become more apparent from the following detailed description when taken in conjunction with the accompanying drawings in which the same or similar features are annotated with identical numerals throughout the several views.

DETAILED DESCRIPTION OF THE PREFERRED EMBODIMENT

Hereinafter, preferred embodiments of the present invention will be described in detail with reference to the accompanying drawings. In the following description of the present invention, detailed description of known functions and configurations incorporated herein is omitted for clarity of presentation.

Figure 2:
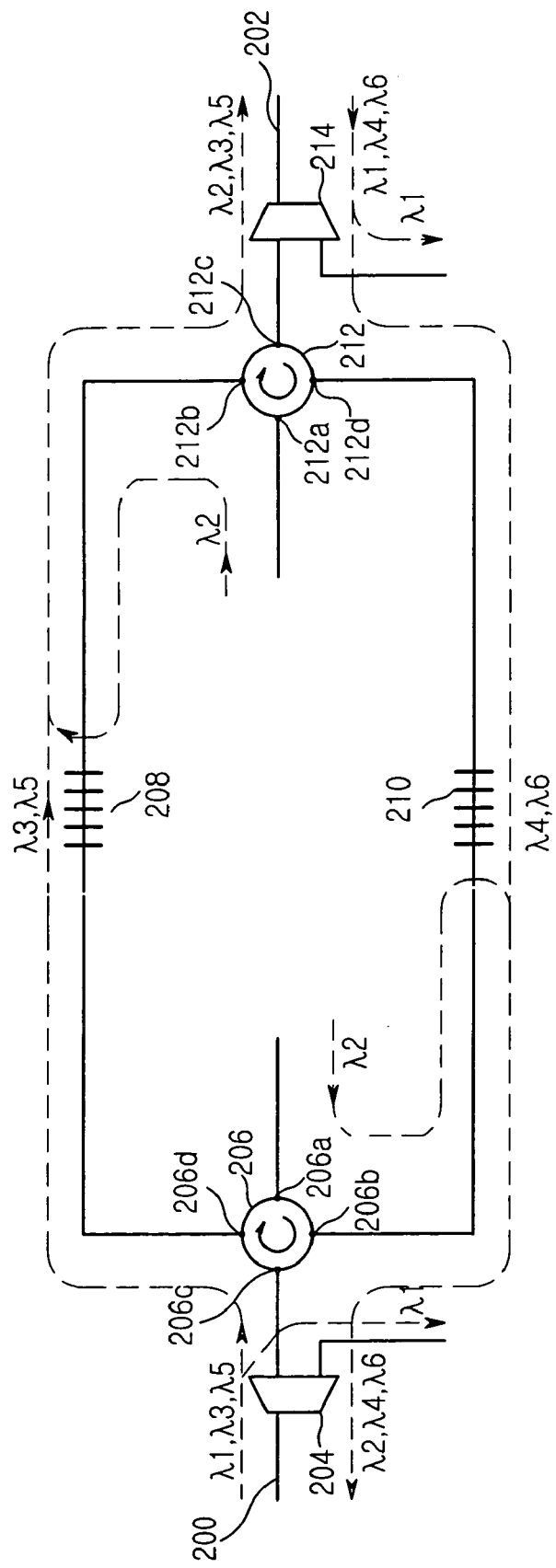
FIG. 2 illustrates a structure of a bidirectional optical add-drop multiplexer according to a first embodiment of the present invention.

FIG. 2 illustrates a structure of a bidirectional optical add-drop multiplexer according to a first embodiment of the present invention.

The wavelengths of two optical signals bidirectionally added are the same. Also, the wavelengths of two optical signals bidirectionally dropped are the same. However, the wavelength of the added optical signal is different from that of the dropped one.

As described in FIG. 2, the bidirectional optical add-drop multiplexer is connected with two neighbor nodes (not depicted) by first and second optical transmission lines 200, 202, receives optical signals having wavelengths $\lambda 1, \lambda 3, \lambda 5$ corresponding to channels 1, 3, 5 through the first transmission line 200 connected with a first neighbor node, and receives optical signals having wavelengths $\lambda 1, \lambda 4, \lambda 6$ corresponding to channels 1, 4, 6 through the second optical transmission line 202 connected with a second neighbor node. The multiplexer drops an optical signal of the wavelength $\lambda 1$ from among the optical signals having the wavelengths $\lambda 1, \lambda 3, \lambda 5$ and then adds an optical signal of the wavelength $\lambda 2$ to the remaining optical signals having the wavelengths $\lambda 3, \lambda 5$.

In particular, the optical signals having wavelengths $\lambda 1, \lambda 3, \lambda 5$ from the first optical transmission line 200 are inputted to a first wavelength division demultiplexer 204. Also, the optical signals having wavelengths $\lambda 1, \lambda 4, \lambda 6$ from the second optical transmission line 202 are inputted to a second wavelength division demultiplexer 214. The first and second demultiplexers 204 and 214 de multiplex the inputted WDM optical signals, extract and output only an optical signal of a specific wavelength, and pass through the other optical signals. The optical signal of a specific wavelength extracted by demultiplexing of the first and second WDDs 204 and 214 is a dropped signal.

Therefore, the first wavelength demultiplexer 204 demultiplexes the inputted optical signals having wavelengths $\lambda 1, \lambda 3, \lambda 5$ from the optical transmission line 200, drops the optical signal having wavelength $\lambda 1$, passes through and inputs the other optical signals having wavelengths $\lambda 3, \lambda 5$ to a port 206c of a first optical circulator 206. Similarly, the second wavelength demultiplexer 214 demultiplexes the inputted optical signals having wavelengths $\lambda 1, \lambda 4, \lambda 6$ from the optical transmission line 202, drops the optical signal having the wavelength $\lambda 1$, passes through and inputs the other optical signals having wavelengths $\lambda 4, \lambda 6$ to a port 212c of a second optical circulator 206. The first and second optical circulators 206 and 212 having four ports circularly arrayed are 4-port circulators and output the optical signals inputted to each port of the optical circulators 206 and 212 to the next port according to sequence in the clockwise direction as described by dot arrows of FIG. 2.

The optical signals having wavelengths $\lambda 3, \lambda 5$ are outputted to a port 206c of the first optical circulator 206 and progress along an upper route of FIG. 2 through a first optical wave selector 208. Also, the optical signals having wavelengths $\lambda 4$ and $\lambda 6$ are outputted to a port 212d of the second optical circulator 212 and progress along a lower route of FIG. 2 through a second optical wave selector 210. Here, the first and second optical wavelength selectors 208 and 210 preset the wavelength $\lambda 2$ as the reflection wavelength, reflect an optical signal having the wavelength $\lambda 2$ and cause optical signals having the other wavelengths to pass through. The optical wavelength selectors may be employed by a fiber Bragg grating, a multi-layer thin film element or a grating structure.

As described above, the optical signals having wavelengths $\lambda 3$ and $\lambda 5$ from a port 206d of the first optical circulator 206 are transmitted the first optical wavelength selector 208 and are inputted to a port 212b of the second optical circulator 212. Concurrently, an optical signal having a wavelength $\lambda 2$ is inputted to a port 212a of the second optical circulator 212 and is added. Accordingly, the optical signal having the wavelength $\lambda 2$ is outputted to a port 212b of the second optical circulator 212, reflected by the first optical wavelength selector 208 and inputted with the optical signals having wavelengths $\lambda 3, \lambda 5$ to a port 212b of the second optical circulator 212. These optical signals having wavelengths $\lambda 2, \lambda 3, \lambda 5$ are outputted from a port 212c of the second optical circulator 212 and transmitted to the second optical transmission line 202 through the second WDD 214.

In the same manner, the optical signals having wavelengths $\lambda 4, \lambda 6$ from a port 212d of the second optical circulator 212 are transmitted to the second optical wavelength selector 210 and are inputted to a port 206b of the optical circulator 206. Herein, an optical signal having wavelength $\lambda 2$ is inputted to a port 206a of the first optical circulator 206 and is added. Accordingly, the optical signal having wavelength $\lambda 2$ is outputted to a port 206b of the second optical circulator 206, reflected by the second optical wavelength selector 210 and inputted with the optical signals having wavelengths $\lambda 4, \lambda 6$ to a port 206b of the first optical circulator 206. These optical signals having wavelengths $\lambda 2, \lambda 4, \lambda 6$ are outputted from a port 206c of the first optical circulator 206 and transmitted to the first optical transmission line 200 through the first WDD 204.

As described above, in the bidirectional optical add-drop multiplexer according to the present invention, the two dropped as well as the two added optical signals have the same wavelengths, but wavelengths of the dropped optical signals are different from those of the added optical signals. Because each of optical wavelength selectors 208 and 210 reflects only an optical signal of a wavelength added to optical signals progressed in different directions, the added optical signals have no effect on the dropped optical signals. Therefore, even though the first and second optical wavelength selectors 208, 210 have lower isolation than the optical wavelength selectors 110, 112, they will not decrease quality of optical signals. The results of experiments based on the present invention show that the multiplexer using WDD having isolation of about 10 dB and optical wavelength selectors having isolation of about 15 dB can sufficiently overcome cross-talk owing to optical elements as well as relative intensity noises occurring in the bidirectional WDM system.

Figure 1:
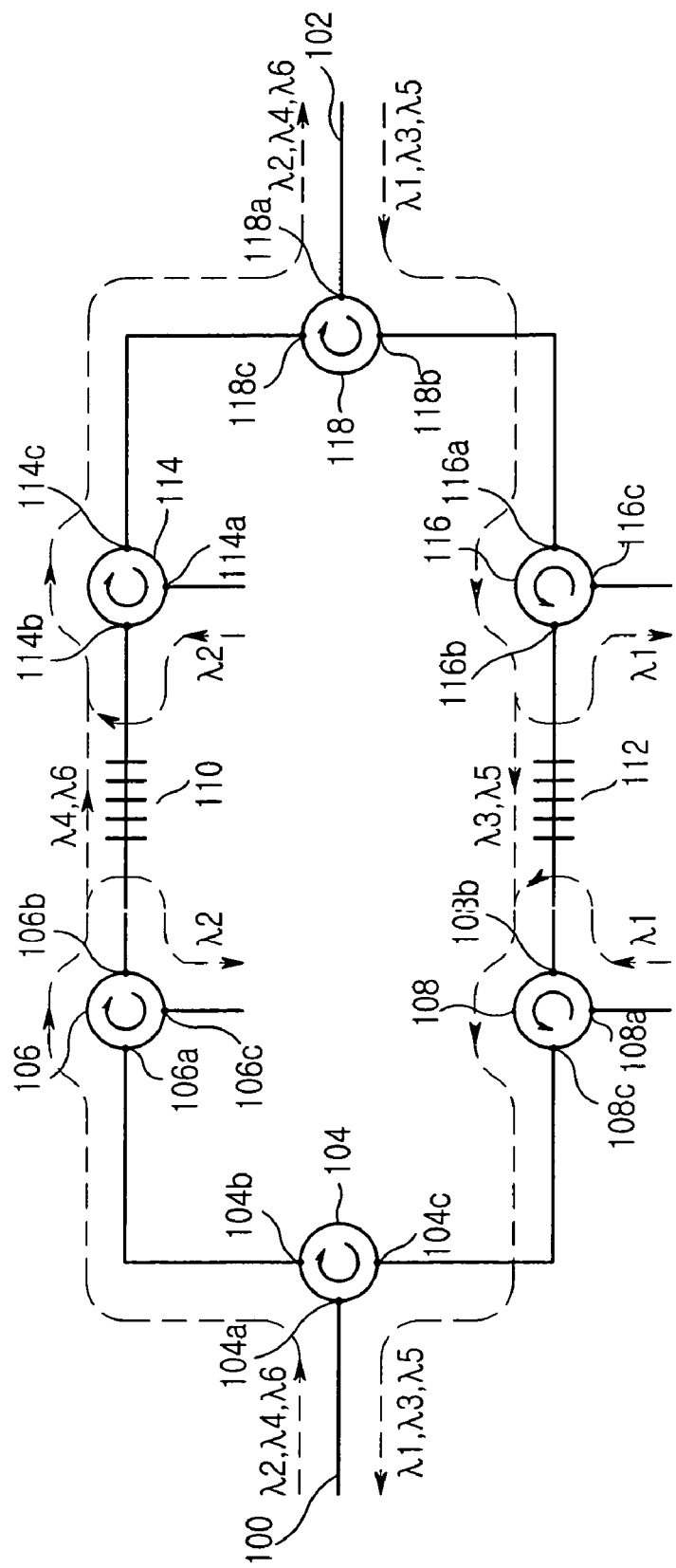
FIG. 1 illustrates a structure of a conventional bidirectional optical add-drop multiplexer.

Also, and in contrast to the present invention, the bidirectional optical add-drop multiplexer of FIG. 1 requires two optical circulators and an optical wavelength selector as components in order to add or drop optical signals progressing in one direction and therefore requires totally six optical circulators and two optical wavelength selectors in order to add or drop optical signals progressing in two directions.

The bidirectional optical add-drop multiplexer according to the present invention, in comparison, requires merely two optical circulators, two WDDs and two optical wavelength selectors as its components. Therefore, the present invention has a simple structure, and features a lower cost for implementation by virtue of having decreased the number of optical elements required.

When a plurality of wavelengths are added or dropped, however, the first and second WDDs 204, 214 and the first and second optical wavelength selectors 208, 210 must be supplemented in proportion to the number of wavelength added or dropped in the bi-directional optical add-drop multiplexer. Here, the supplemented WDD must be suitable for demultiplexing optical signals having wavelengths to be dropped and the supplemented optical wavelength selectors must be suitable for reflecting wavelengths to be added.

Figure 3:
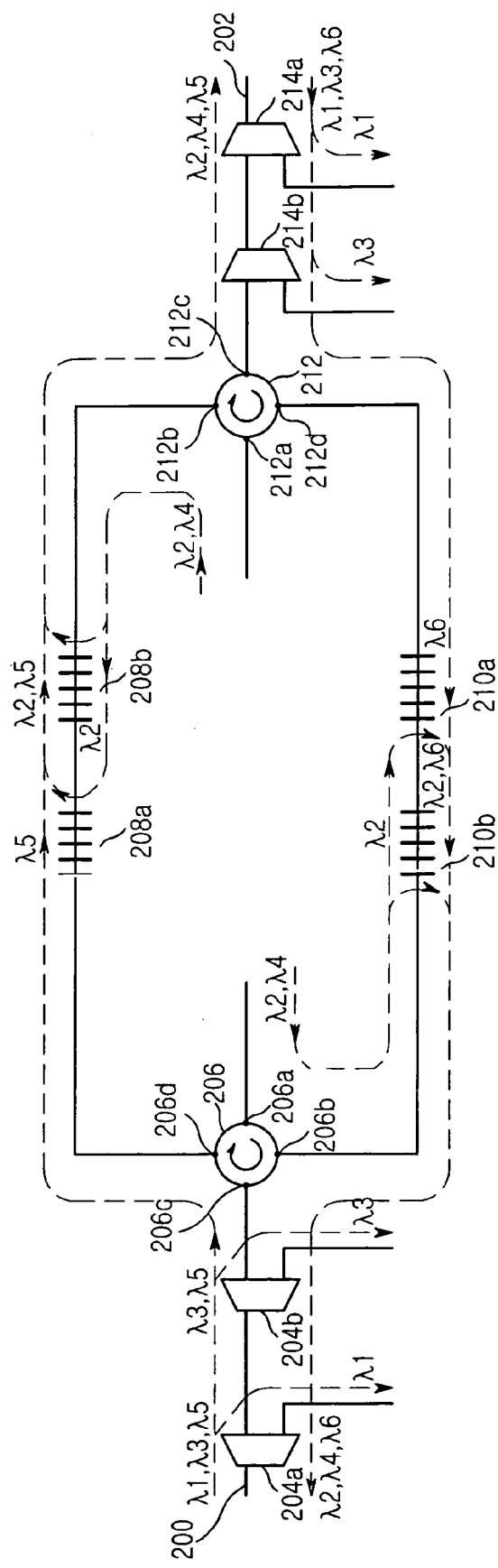
FIG. 3 illustrates a structure of a bidirectional optical add-drop multiplexer according to a second embodiment of the present invention.

FIG. 3 illustrates, in a second embodiment of the present invention, a structure of an optical add-drop multiplexer according to the present invention in a case of a plurality of wavelengths added or dropped, and particularly shows an embodiment for the structure of the multiplexer in a case of two wavelengths added or dropped. As shown in FIG. 3, the bidirectional optical add-drop multiplexer receives optical signals having wavelengths $\lambda1, \lambda3, \lambda5$ from a first optical transmission line 200 and optical signals having wavelengths $\lambda1, \lambda3, \lambda6$ from a second optical transmission line 202. The optical signals of wavelengths $\lambda1, \lambda3$ are dropped, and then the optical signals of wavelengths $\lambda2, \lambda4$ are added, while the optical signals having wavelengths $\lambda1, \lambda3, \lambda6$ pass through the multiplexer. Similarly, while the optical signals having wavelengths $\lambda1, \lambda3, \lambda5$ pass through the multiplexer, the optical signals of wavelengths $\lambda1, \lambda3$ are dropped and then the optical signals of wavelengths $\lambda2, \lambda4$ are added.

Comparing the second embodiment with the first, two first WDM demultiplexers 204a, 204b replacing the first WDD 204 in FIG. 2 are connected in series between the first optical transmission line 200 and a port 206c of the first optical circulator 206. Two second WDDs 214a, 214b replacing the second WDD 214 are connected in series between the second optical transmission line 202 and a port 212c of the second optical circulator 212. Also, two first optical wavelength selectors 208a, 208b replacing the first optical wavelength selector 208 are connected in series between a port 206d of the first optical circulator 206 and a port 212b of the second optical circulator 212, and two second optical wavelength selectors 210a, 210b replacing the second optical second selector 210 are connected in series between a port 212d of the second optical circulator 212 and a port 206b of the first optical circulator 206. As a consequence and in particular, the drop wavelength of the first WDD 204a and the second WDD 214a is $\lambda1$, the drop wavelength of the first WDD 204b and the second WDD 214b is $\lambda3$, the reflection wavelength of the first optical wavelength selector 208a and the second optical wavelength selector 210a is $\lambda2$, and the reflection wavelength of the first optical wavelength selector 208b and the second optical wavelength selector 210b is $\lambda4$.

Thus, when optical signals having wavelengths $\lambda1, \lambda3, \lambda5$ inputted through the first optical transmission line 200 pass through the first WDDs 204a, 204b, optical signals having the wavelengths $\lambda1, \lambda3$ are dropped one after another. The other optical signals not being dropped are passed through the first optical circulator 206, transmitted by the first optical wavelength selectors 208a, 208b, and inputted to the port 212b of the second optical circulator 212. Concurrently, optical signals having the wavelengths $\lambda2, \lambda4$ to be added are inputted to a port 212a of the second optical circulator 212. Accordingly, the optical signals having the wavelengths $\lambda2, \lambda4$ to be added are outputted from the port 212b of the second optical circulator 212 and inputted to the first optical wavelength selector 208b. The optical signal having the wavelength $\lambda4$ is right reflected by the first optical wavelength selector 208b. Also the optical signal having the wavelength $\lambda2$ is transmitted to the first optical wavelength selector 208b and then reflected by the other first optical wavelength selector 208a. Accordingly, an optical signal having the wavelength $\lambda5$ which passes through the first optical circulator 206 and is transmitted by the first optical wavelength selectors 208a, 208b, an optical signal having the wavelength $\lambda4$ reflected by the first optical wavelength selector 208b and an optical signal having the wavelength $\lambda2$ reflected by the first optical wavelength selector 208a are inputted to the port 212b of the second optical circulator 212 and outputted to a port 212c. As a result, the optical signal having wavelength $\lambda5$ combines with optical signals having wavelengths $\lambda2$ and $\lambda4$ and are together transferred to the second optical transmission line 202 through the second WDDs 214b, 214a.

Analogously, when optical signals having wavelengths $\lambda1, \lambda3, \lambda6$ inputted through the second optical transmission line 202 pass through the first WDD 214a, 214b, optical signals having the wavelengths $\lambda1, \lambda3$ of the optical signals are dropped one after another. The other optical signals not being dropped are passed through the second optical circulator 212, transmitted by the second optical wavelength selectors 210a, 210b and inputted to the port 206b of the first optical circulator 206. Concurrently, optical signals having wavelengths $\lambda2, \lambda4$ to be added are inputted to a port 206a of the first optical circulator 206. Accordingly, the optical signals having wavelengths $\lambda2, \lambda4$ to be added are outputted from a port 206b of the first optical circulator 206 and inputted to the second optical wavelength selector 210b. The optical signal having wavelength $\lambda4$ is right reflected by the second optical wavelength selector 210b. Also the optical signal having wavelength $\lambda2$ is transmitted to the second optical wavelength selector 210b and then reflected by the other second optical wavelength selector 210a. Accordingly, an optical signal having the wavelength $\lambda6$ which passes through the second optical circulator 212 and is transmitted by the second optical wavelength selectors 210a, 210b, an optical signal having the wavelength $\lambda4$ reflected by the second optical wavelength selector 210b and an optical signal having the wavelength $\lambda2$ reflected by the second optical wavelength selector 210a are inputted to the port 206b of the first optical circulator 206 and outputted to a port 206c. As a result, the optical signal having wavelength $\lambda6$ combines with optical signals having wavelengths $\lambda2$ and $\lambda4$ and are together transferred to the first optical transmission line 200 through the first WDDs 204b, 204a.

Meanwhile, although FIG. 3 shows that as many WDDs as the number of added or dropped wavelengths are used, WDDs (capable of) simultaneously dropping by demultiplexing a plurality of optical signals instead of only one optical signal may be employed.

Figure 4:
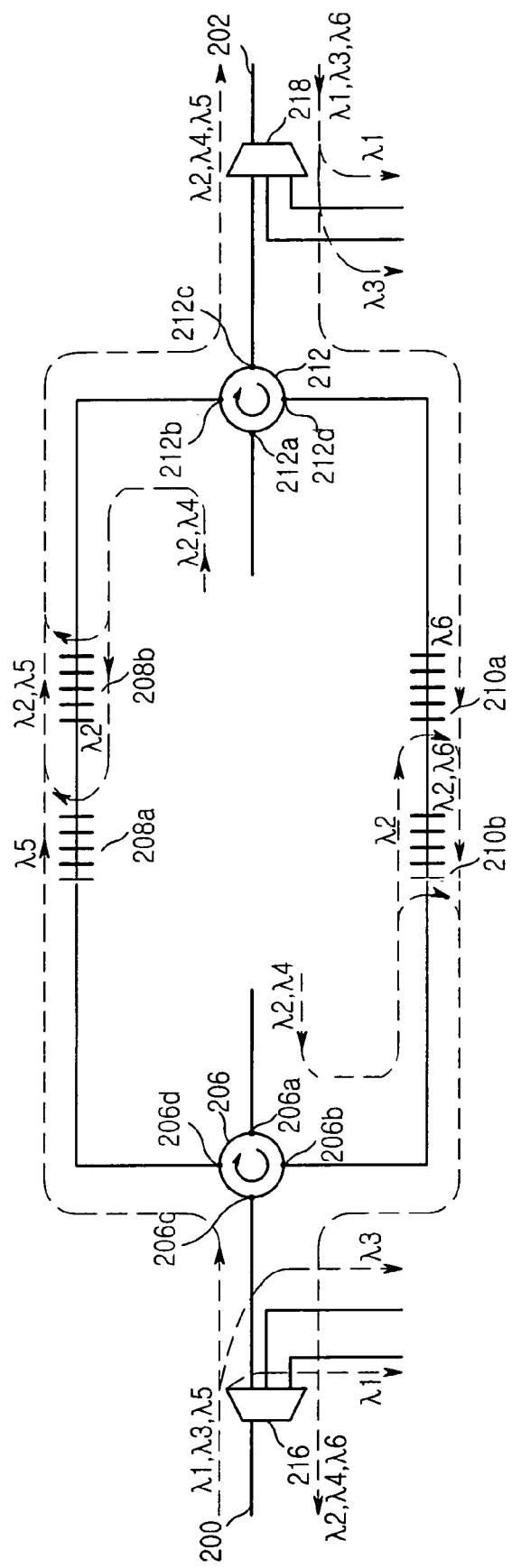
FIG. 4 illustrates a structure of the bidirectional optical add-drop multiplexer according to a third embodiment of the present invention.

As described above, the third embodiment of the present invention as depicted in FIG. 4 illustrates a structure of a bidirectional optical add-drop multiplexer comprising WDDs, each of which simultaneously drops by demultiplexing a plurality of optical signals, in which two wavelengths are added or dropped.

Comparing the third embodiment of the present invention to the second, the first WDD 216 dropping by demultiplexing two optical signals having wavelengths $\lambda1, \lambda3$ simultaneously is employed in place of two first WDDs 204a, 204b in FIG. 4. Similarly, the second WDD 218 dropping by demultiplexing two optical signals having wavelengths λ1, λ3 simultaneously is employed in place of two second WDDs 214a, 214b in FIG. 4.

The operation principle of this bidirectional optical add-drop multiplexer shown in FIG. 4 is the same as that of the bidirectional optical add-drop multiplexer shown in FIG. 3 except that the first and second WDDs 216, 218 drop the optical signals having wavelengths λ1, λ3 simultaneously. Therefore, further description for FIG. 4 is omitted.

As described above, the present invention can avoid degradation in the quality of optical signals resulting from cross-talk between the added and dropped optical signals by means of a bidirectional optical add-drop multiplexer of relatively simple structure, employing relatively few optical elements.

The intended scope of the present invention is not limited to an optical WDM bidirectional hubbed ring network, but, more generally, may be implemented for an optical transmission network where two WDM optical signals having different WDM channels are transmitted in directions opposite to each other through one optical transmission line. Also, wavelength-variable WDDs in which wavelengths demultiplexed are variable may be used as the WDDs shown in FIG. 2 or FIG. 4, Similarly, wavelength-variable optical wavelength selectors in which their reflection wavelengths are variable may be used as optical wavelength selectors in any of the embodiments shown in FIGS. 2 to 4.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A bidirectional optical add-drop multiplexer for WDM (wavelength division multiplexing) optical signals being transmitted in directions opposite to each other through different WDM channels of one optical transmission line in an optical WDM bidirectional ring network, said multiplexer comprising:

first and second optical circulators each having four ports, and among the ports, respective first ports for input of an optical signal having a wavelength to be added;

a first WDD (wavelength division demultiplexer) which drops an optical signal having a specific wavelength by demultiplexing optical WDM signals transmitted through a first portion of said one optical transmission line, outputs to a third port of the first optical circulator optical signals not being dropped, and transmits to said first portion optical signals from a second portion of said optical transmission line inputted from the third port of the first optical circulator;

a first optical wavelength selector which is connected between a fourth port of the first optical circulator and a second port of the second optical circulator, reflects an optical signal that is to be added among optical signals inputted from the third port of the first optical circulator, and passes optical signals not being added;

a second WDD which drops an optical signal having a specific wavelength by demultiplexing optical WDM signals transmitted through said second portion, outputs to a third port of the second optical circulator optical signals not being dropped, and transmits to said second portion optical signals inputted from the third port of the second optical circulator; and a second optical wavelength selector which is connected between a second port of the first optical circulator and a fourth port of the second optical circulator, reflects an optical signal having a wavelength that is to be added among the optical signals inputted from the third port of the second optical circulator, and passes optical signals not being added.

2. A bidirectional optical add-drop multiplexer as claimed in claim 1, wherein the wavelength of said optical signal that is to be added among optical signals inputted from the third port of the first optical circulator differs from said specific wavelength of the optical signal dropped by the first WDD.

3. A bidirectional optical add-drop multiplexer as claimed in claim 1, wherein said specific wavelength of the optical signal dropped by the first WDD is the same as said specific wavelength of the optical signal dropped by the second WDD.

4. A bidirectional optical add-drop multiplexer as claimed in claim 1, wherein, for each of the circulators, the ports are circularly sequential so that an optical signal inputted through one of the ports is outputted through a next one of the ports.

5. A bidirectional optical add-drop multiplexer as claimed in claim 1, wherein said wavelength that is to be added among the optical signals inputted from the third port of the second optical circulator differs from said specific wavelength dropped by the second WDD.

6. A bidirectional optical add-drop multiplexer as claimed in claim 5, wherein said wavelength that is to be added among the optical signals inputted from the third port of the second optical circulator is the same as said wavelength that is to be added among the optical signals inputted from the third port of the first optical circulator.

7. A bidirectional optical add-drop multiplexer as claimed in claim 1, wherein the number of optical signals dropped upon demultiplexing by the first WDD is equal to the number of wavelengths dropped upon said demultiplexing by the second WDD.

8. A bidirectional optical add-drop multiplexer as claimed in claim 7, wherein the number of optical signals reflected by each of the first and second optical wavelength selectors is equal to the number of wavelengths added by said each of the first and second optical wavelength selectors.

9. A bidirectional optical add-drop multiplexer as claimed in claim 1, wherein the number of optical signals reflected by each of the first and second optical wavelength selectors is equal to the number of wavelengths added by said each of the first and second optical wavelength selectors.

10. A bidirectional optical add-drop multiplexer for wave division multiplexing (WDM) optical signals being transmitted in directions opposite to each other through different WDM channels of one optical transmission line in an optical WDM bidirectional ring network, said multiplexer comprising:

first and second optical circulators each having four ports, and among the ports, respective first ports for input of an optical signal having a wavelength to be added;

first WDDs (wavelength division multiplexers), connected in tandem on a first portion of said one optical transmission line, which drop optical signals having specific respective wavelengths, output to a third port of the first optical circulator optical signals not being dropped. and transmit to said first portion optical signals inputted from the third port of the first optical circulator;

first optical wavelength selectors which are connected between a fourth port of the first optical circulator and a second port of the second optical circulator, reflect one by one in order optical signals that are to be added among optical signals inputted from the third port of the first optical circulator, and pass optical signals not being added;

second WDDs, connected in tandem on a second portion of said optical transmission line, which drop optical signals having specific respective wavelengths, output to a third port of the second optical circulator optical signals not being dropped, and transmit to a second portion of said optical transmission line optical signals inputted from the third port of the second optical circulator; and second optical wavelength selectors which are connected between a second port of the first optical circulator and a fourth port of the second optical circulator, reflect optical signals having respective wavelengths that are to be added among the optical signals inputted from the third port of the second optical circulator, and pass optical signals not being added.

11. A bidirectional optical add-drop multiplexer as claimed in claim 10, wherein wavelengths of optical signals that are to be added among optical signals inputted from the third port of the first optical circulator differ from said specific respective wavelengths of optical signals dropped by the first WDDs.

12. A bidirectional optical add-drop multiplexer as claimed in claim 10, wherein said specific respective wavelengths of optical signals dropped by the first WDDs are the same as said specific respective wavelengths of optical signals dropped by the second WDDs.

13. A bidirectional optical add-drop multiplexer as claimed in claim 10, wherein, for each of the circulators, the ports are circularly sequential so that an optical signal inputted through one of the ports is outputted through a next one of the ports.

14. A bidirectional optical add-drop multiplexer as claimed in claim 10, wherein said respective wavelengths that are to be added among the optical signals inputted from the third port of the second optical circulator differ from said specific respective wavelengths dropped by the second WDDs.

15. A bidirectional optical add-drop multiplexer as claimed in claim 14, wherein said respective wavelengths that are to be added among the optical signals inputted from the third port of the second optical circulator are the same as said respective wavelengths that are to be added among the optical signals inputted from the third port of the first optical circulator.

16. A bidirectional optical add-drop multiplexer as claimed in claim 10, wherein the number of optical signals dropped upon demultiplexing by the first WDDs is equal to the number of wavelengths dropped upon said demultiplexing by the second WDDs.

17. A bidirectional optical add-drop multiplexer as claimed in claim 16, wherein the number of optical signals reflected by each of the first and second optical wavelength selectors is equal to the number of wavelengths added by said each of the first and second optical wavelength selectors.

18. A bidirectional optical add-drop multiplexer as claimed in claim 10, wherein the number of optical signals reflected by each of the first and second optical wavelength selectors is equal to the number of wavelengths added by said each of the first and second optical wavelength selectors.

19. A bidirectional optical add-drop multiplexer for WDM (wavelength division multiplexing) optical signals being transmitted in directions opposite to each other through different WDM channels of one optical transmission line in an optical WDM bidirectional ring network, said multiplexer comprising:

first and second optical circulators each having four ports, and among the ports, respective first ports for input of an optical signal having a wavelength to be added;

a first WDD (wavelength division multiplexer) which drops optical signals having specific respective wavelengths by demultiplexing the optical WDM signals transmitted through a first portion of said one optical transmission line, outputs to a third port of the first optical circulator optical signals not being dropped, and transmits to said first portion optical signals inputted from the third port of the first optical circulator;

first optical wavelength selectors which are connected between a fourth port of the first optical circulator and a second port of the second optical circulator, reflect one by one in order optical signals that are to be added among optical signals inputted from the third port of the first optical circulator, and passes optical signals not being added;

a second WDD which drops optical signals having specific respective wavelengths by demultiplexing optical signals transmitted through a second portion of said optical transmission line, outputs to a third port of the second optical circulator optical signals not being dropped, and transmits to said second portion optical signals inputted from the third port of the second optical circulator; and second optical wavelength selectors which are connected between a second port of the first optical circulator and a fourth port of the second optical circulator, reflect one by one in order optical signals having specific respective wavelengths that are to be added among the optical signals inputted from the third port of the second optical circulator, and pass optical signals not being added.

20. A bidirectional optical add-drop multiplexer as claimed in claim 19, wherein wavelengths of optical signals that are to be added among optical signals inputted from the third port of the first optical circulator differ from said specific respective wavelengths of optical signals dropped by the first WDD.

21. A bidirectional optical add-drop multiplexer as claimed in claim 19, wherein said specific respective wavelengths of optical signals dropped by the first WDD are the same as said specific respective wavelengths of optical signals dropped by the second WDD.

22. A bidirectional optical add-drop multiplexer as claimed in claim 19, wherein said respective wavelengths that are to be added among the optical signals inputted from the third port of the second optical circulator differ from said specific respective wavelengths dropped by the second WDD.

23. A bidirectional optical add-drop multiplexer as claimed in claim 22, wherein said respective wavelengths that are to be added among the optical signals inputted from the third port of the second optical circulator are the same as said respective wavelengths that are to be added among the optical signals inputted from the third port of the first optical circulator.

24. A bidirectional optical add-drop multiplexer as claimed in claim 19, wherein the number of optical signals dropped upon demultiplexing by the first WDD is equal to the number of wavelengths dropped upon said demultiplexing by the second WDD.

25. A bidirectional optical add-drop multiplexer as claimed in claim 24, wherein the number of optical signals reflected by each of the first and second optical wavelength selectors is equal to the number of wavelengths added by said each of the first and second optical wavelength selectors.

26. A bidirectional optical add-drop multiplexer as claimed in claim 19, wherein the number of optical signals reflected by each of the first and second optical wavelength selectors is equal to the number of wavelengths added by said each of the first and second optical wavelength selectors.

\* \* \* \* \*